United States Patent Office 3,440,523
Patented Apr. 22, 1969

3,440,523
METHOD AND APPARATUS FOR ELECTROMAGNETIC DETERMINATION OF THE POSITION OF BOUNDARIES OF AND DISCONTINUITIES IN A GEOLOGICAL FORMATION
Robert Gabillard, Lille, France, assignor to Institut Francais du Petrole, des Carburants et Lubrifiants, Rueil-Malmaison, Hauts-de-Seine, France, a corporation of France
Filed Mar. 28, 1966, Ser. No. 537,795
Claims priority, application France, Apr. 2, 1965, 11,837; Apr. 16, 1965, 13,718
Int. Cl. G01v 3/12
U.S. Cl. 324—6   10 Claims

ABSTRACT OF THE DISCLOSURE

The positions of discontinuities in a geological formation are determined by propagating electromagnetic waves from a station in the formation through the formation and receiving waves reflected from the discontinuities at the station. The station has a rectinlinear emitter for the waves and at least one receiving frame for the reflected waves mounted to rotate around the emitter tangentially to a cylindrical surface of revolution about the emitter. Saturation of the receiver by the emitted waves is thereby prevented and only the waves reflected by the discontinuities are received and the direction of the discontinuities are determined.

---

One of the problems of the mining industry is the determination of the lateral extent of deposits or veins of the various layers of minerals to be mined, as well as the location of discontinuities in these deposits resulting from faults or inclusions.

For example, in the mining of a deposit of gypsum, it is desirable to know how far the drifts should be extended before reaching the end of the deposit or before reaching an inclusion of marl. In coal and lignite mines it is important to know when a fault will be reached which has displaced the beds with respect to each other in the vertical plane.

It is also important to be able to determine the reserves in a pocket or pool of petroleum.

Methods now used for diagraphing such deposits unfortunately cannot be used to determine the nature of the geological layers traversed by a probe except in the immediate vicinity thereof and the effective distance seldom is greater than several meters around the probe.

The object of the present invention is to determine the position of the boundaries of and discontinuities in a geological formation utilizing electromagnetc means.

A further and more particular object of the present invention is the determination of the position of the boundaries of and discontinuities in a geological formation adjacent to geological layers having a weaker resistivity, the formation being studied by emitting electromagnetic waves in the formation from a location in the formation and by detecting at this location the electromagnetic waves reflected by the boundaries or the discontinuities in the formation being studied.

By knowing the speed of propagation of waves in the geological structure, which speed can be determined by the methods described in applicant's copending application, "Method and Apparatus for Measuring the Speed Propagation of Electromagnetic Waves in the Earth," it is then possible to calculate from the time separating the emission of the wave and the return of the echo the distance of the geological discontinuity which causes the echo.

Even though such a method appears rather simple, numerous difficulties are encountered in carrying out the method. The principal difficulties are associated with the following phenomena:

The speed of propagation of electromagnetic waves in the earth depends on the frequency of the waves.

For the frequencies that can be used to obtain a sufficient range, that is, the low frequencies, absorption by the earth increases exponentially with the frequency. The time required by the wave going to and returning from the discontinuity that is to be located is only several periods of oscillation of the wave. The echo arrives frequently before the emitter has stopped emission and the receiver being then saturated, it is not possible to distinguish it from the emitted signal without taking particular precautions.

In particular, it is not possible, as is practiced in a process of the radar type, to utilize the same antenna for emission and for reception.

The present invention overcomes the difficulty associated with the short time required by the wave to go from the emitter and return from the discontinuity by providing a process in which electromagnetic waves are emitted in the deposit being studied and the reflected waves received before the end of emission without saturation of the receiver by the emitter.

This result is obtained by utilizing the known property of receiving frames for electromagnetic waves of being insensitive to a plane wave of which the plane of the wave coincides with the plane of the frame and of having maximum sensitivity when the plane of the frame is perpendicular to the plane of the wave.

The process of the present invention can be used to determine the position of the boundaries of a geological formation with respect to a measuring station located in the formation even when the boundaries are at a long distance from the measuring station on the order of from several hundred meters to several kilometers.

The range will vary, depending upon the geological formation studied and the power of the electromagnetic emitter.

For example, the range in gypsum is on the order of 500 meters for an emitter having a power of 20 watts.

An advantage of the present invention is that not only can the distance be determined of a discontinuity with respect to the point of observation but the direction in which the discontinuity is located can also be determined resulting in an exact location of the discontinuity.

A preferred embodiment of the present invention will be described hereinafter with reference to the accompanying drawings, in which like reference characters indicate like parts, but this preferred embodiment should in no way be construed as defining or limiting the invention.

In the accompanying drawings.

Figure 1:
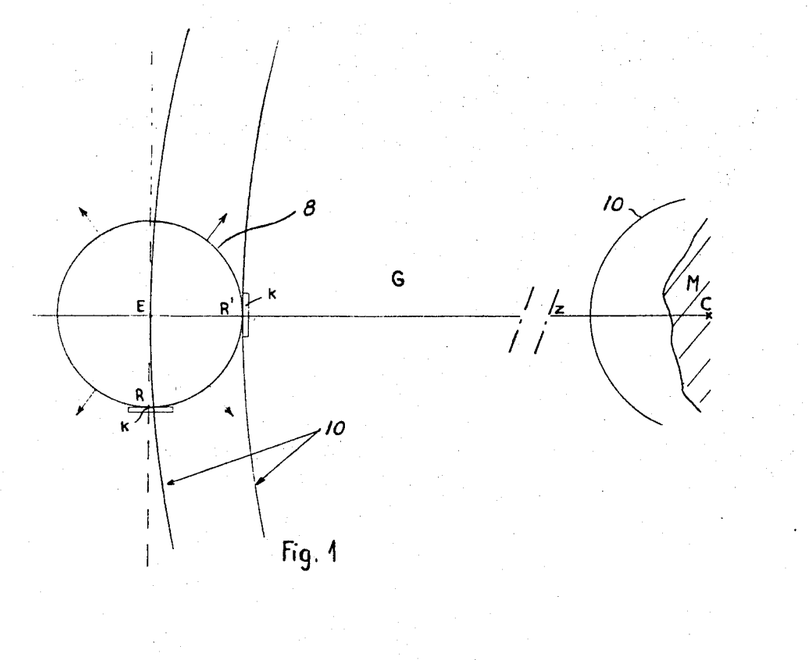
FIG. 1 shows schematically an embodiment of the process of the present invention.
Figure 1A:
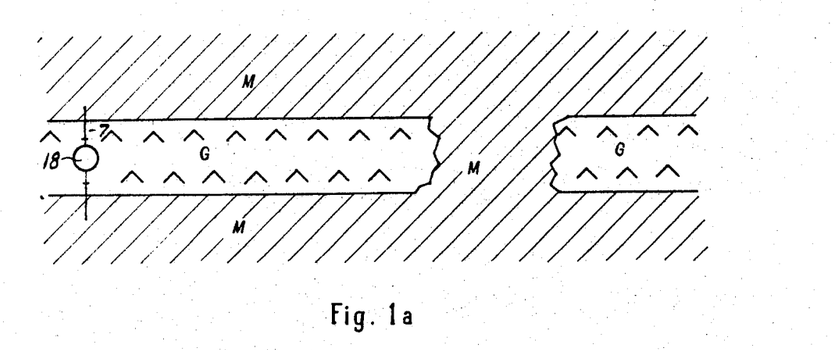
FIGS. 1a to 1d show examples of geological structures in which the process of the invention can be carried out.
Figure 1B:
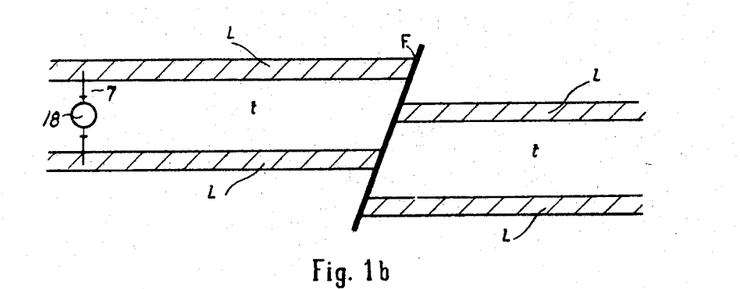
Figure 1C:
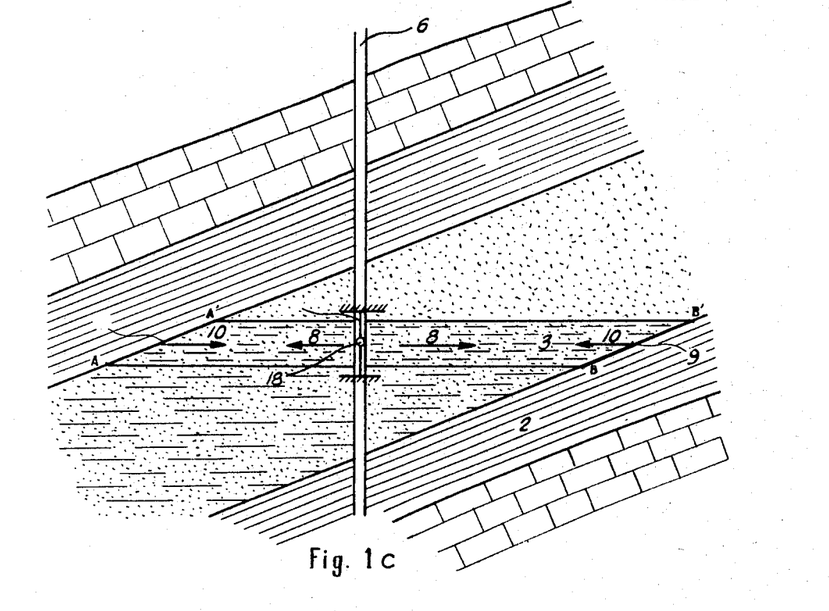
Figure 1D:
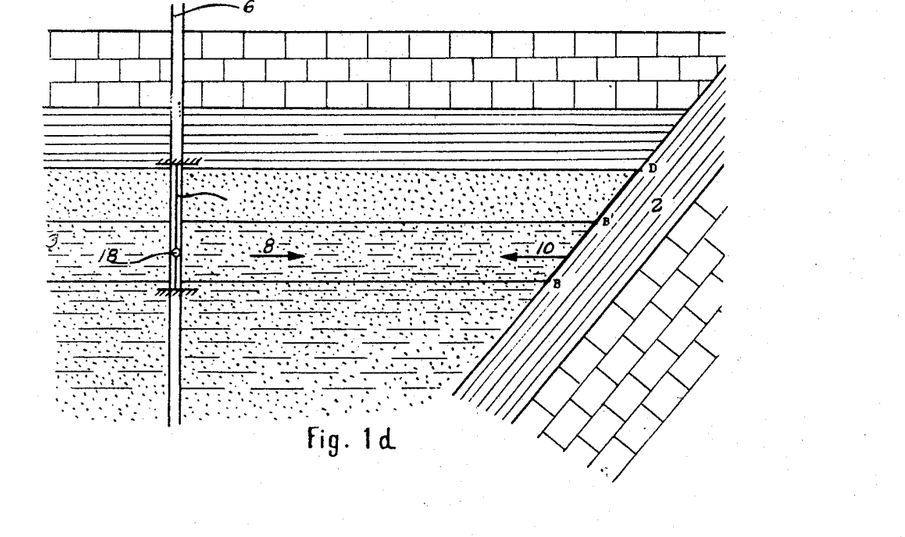
Figure 2:
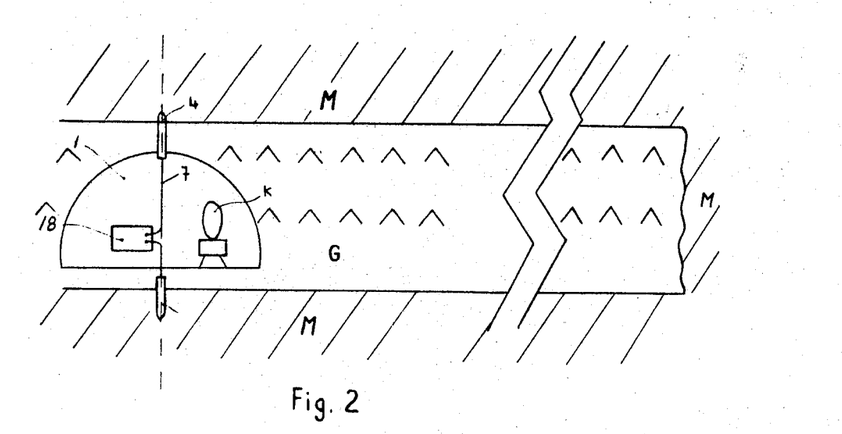
FIG. 2 illustrates a first embodiment of emitting and receiving apparatus.

Electromagnetic waves of low frequency having cylindrical wave surfaces 8 of revolutions around an axis of emission, which is perpendicular to the plane of FIG. 1, and whose trace is E on this plane, are emitted in the geological formation G to be studied from a location situated in the geological formation such as a probe shaft 6 in FIGS. 1c and 1d, or a drift 1 in FIG. 2.

These waves preferably should have an electric polarization, (direction of the electric field) parallel to the axis emission.

The axis of emission is that of an antenna 7 connected to an emitting apparatus 18 which can include, as shown in FIG. 2, two pins driven into the earth and aligned one with the other and located in the same vertical line.

In the plane of FIG. 1, the cylindrical surfaces 8 of the waves are traced as circles having the center E. The emitted waves will be reflected if a discontinuity in the formation being studied, as represented at G, is located in the direction EZ perpendicular to the axis of emission, this discontinuity corresponding, for example, to the presence of a geological formation M of a different characer and of a different electrical resistivity less than that of formation G.

The wave surfaces of the reflected waves 10 are traced on the plane of FIG. 1 as circle centered at a point C in the formation M.

In the neighborhood of E, these waves are practically plane and perpendicular to the direction EZ, the point C being located at a distant point in this direction.

It is possible to receive the reflected waves without being saturated by the emitted waves by using the property of receiving frames for electromagnetic waves of being insensitive to a wave having the plane of the wave coincident with their plane, and having maximum sensitivity when these two planes are at right angles.

By placing the receiving frame K at R in FIG. 1 parallel to the direction EZ and parallel to the direction of the axis of emission only reflected waves will be received, the antenna being insensitive to the emitted wave.

The difficulty discussed above, arising from the short time required for the electromagnetic waves to go to and return from the reflecting surface, is thus overcome.

In the present concept, it is possible to receive an echo even though the emitter, antenna 7, has not yet finished emitting the direct wave without saturation of the receiver by the emitter.

FIG. 1a shows a gypsum deposit to be studied by the process of the present invention. The layer of gypsum G possesses a high electric resistivity, generally greater than 1000 $\Omega$m., and it is surrounded by terrain M of much smaller resistivity, for example, marl has a resistivity between 5 and 10 $\Omega$m.

FIG. 1b shows a deposit of lignite L, in which the layers, generally of small thickness and close together and having a weak resistivity of about 50 $\Omega$m. surround a deposit t having a much higher resistivity of about 500 $\Omega$m.

Figure 1E:
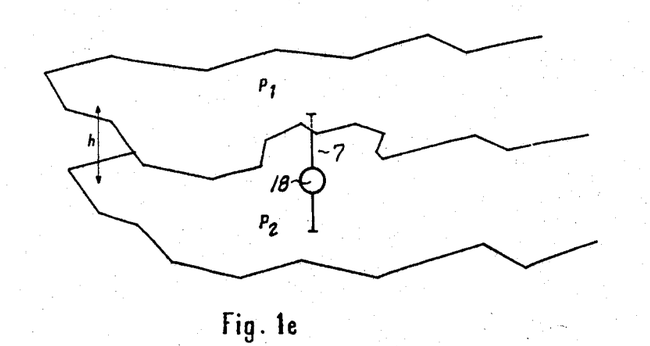
FIG. 1e is a representation of an ideal geological structure.

FIG. 1e shows an ideal wave guide comprising two parallel metallic planes $P_1$ and $P_2$ separated by a dielectric having a thickness h, the geological structure shown in FIGS. 1a and 1b being approximate equivalents to this ideal construction.

FIG. 1c shows a deposit of petroleum contained in porous rock located between two generally inclined impermeable layers 2. In horizontal layer 3 the pores of rock are impregnated with oil; below the rock is impregnated with salt water; and above the rock is impregnated with gas.

From the electromagnetic point of view, the rock impregnated with salt water is a good conductor having a resistivity on the order of several ohms-meters, while the rock impregnated with oil and gas is a relatively good dielectric having a resistivity on the order of 1000 ohms-meters. From the point of view of the electromagnetic waves, the water-oil interface possesses properties similar to those of the surface of the earth. The great difference between the resistivity of water and oil causes a cylindrical wave with electric polarization parallel to the surface of the wave to be propagated tangentially to the interface.

In accordance with the present invetnion, an antenna 7 is installed in a probe 6 and is fed by a generator 18. This antenna emits a cylindrical wave 8 which is proagated radially from the axis of the probe. When this wave meets the area 9 such as A A' and B B' of impermeable layers 2 which border the deposit, the waves are subjected to reflection and create reflected wave 10 which returns toward the antenna where it is received at a time ($\tau$) after the emission of the direct wave 8.

The measure of $\tau$ together with a knowledge of the speed of propagation of the electromagnetic waves in the rock impregnated with oil provides the lateral extent of the deposit.

Another type of petroleum deposit where the process of the present invention can be used is that shown in FIG. 1d. In this case, the lower part of the antenna is located in the salt water and the upper part of the antenna is located in the permeable layer having a generally weak resistivity which constitutes the top of the deposit. The present invention then is used to determine the drilling distance to the reflecting part BD of the layer which defines the deposit.

FIG. 1d shows the present invention can also be utilized outside of the petroleum field to determine the distance from a bore hole to a fault, dislocation, or other geological discontinuity such as BD, even if, on either side BD, the terrain comprises displaced horizontal layers. It is only necessary to have a geological structure such that a layer of high electric resistivity located between two layers of weak resistivity. The location of favorable layers should preferably be determined by known methods of diagraphing.

FIG. 2 illustrates schematically a first embodiment of emitting and receiving apparatus for carrying out the present invention. Emitter 18 is located in a gallery 1 and is connected between two pegs 4 and 5, buried preferably in layers of weak resistivity, marl for example, which make up the floor and roof of the deposit. It is also possible to bury the pegs in the layer of the deposit having high resistivity but this is less advantageous because, the intensity of the electromagnetic wave being proportionate to the current, it is necessary in this case to use more power to produce an electromagnetic wave of a given intensity.

The receiver is placed at some distance from the emitter and is connected to the poles of receiving frame or loop K orientable about a vertical axis in the desired position. In the case of a lignite mine, emitter 18 would be connected to the two adjacent layers as shown in FIG. 1b.

Figure 2A:
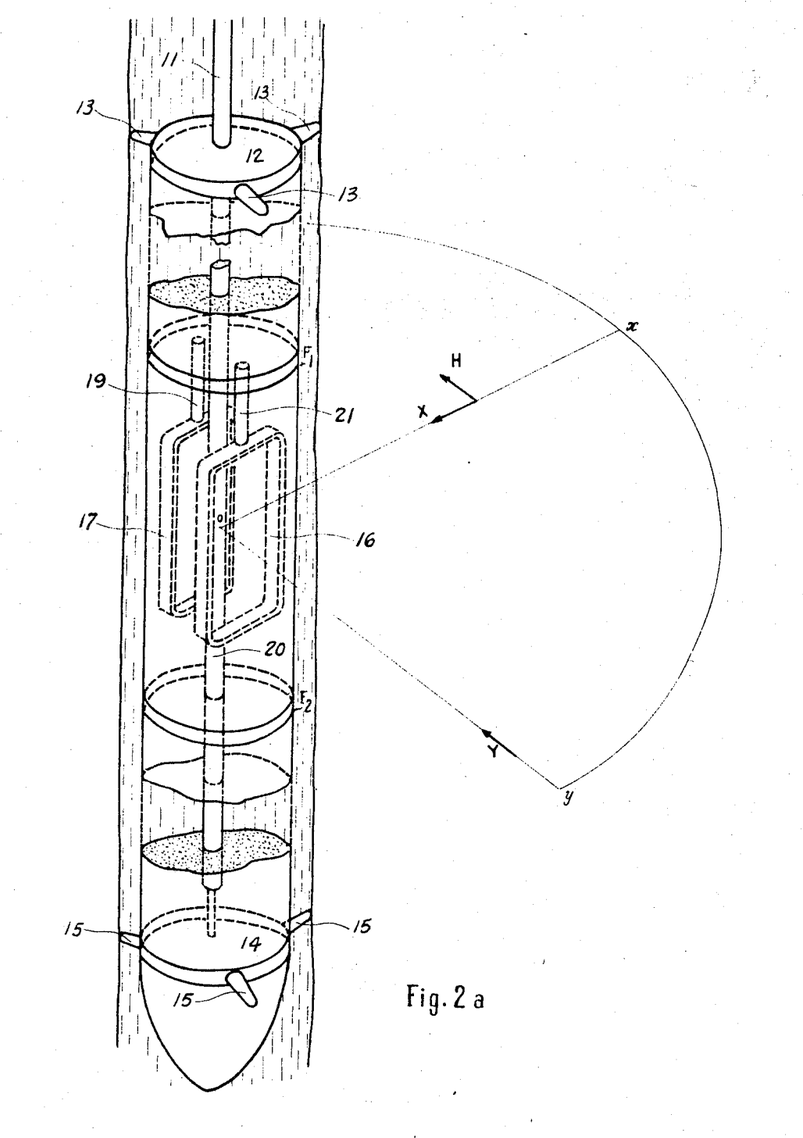
FIG. 2a illustrates a probe corresponding to another embodiment of emitting and receiving apparatus.

FIG. 2a shows a probe for carrying out the present invention. This probe is shown located within a bore hole and corresponds to a second embodiment of the emitting and receiving apparatus.

The emitter is a low frequency power amplifier located at the surface of the earth which furnishes a sinusoidal current I to a coaxial cable 11, the exterior conductor of which is electrically connected to the upper crown 12 which, through contact fingers 13, engages the wall of the bore. The central conductor of the coaxial cable is electrically connected to the walls of the bore by lower crown 14 and by lower contact fingers 15, the receiving antenna being formed by part 20 of said central conductor, between the lower and upper contacts. The distances between the plane $F_1$ of the probe and upper crown and between the plane $F_2$ of the probe and the lower crown 14 can be changed as desired by means of coaxial extension rings. Adjustment of the vertical dimension of the probe is done before descent into the bore hole in accordance with information furnished by conventional resistivity diagraph of the thickness of the geological formation to be studied.

In this way it is possible to bring the probe into position so that its middle part $F_1$, $F_2$ will be in the zone of rock impregnated with oil and the lower contacts 15 will be in salt water when the upper contacts 13 are in a layer of weak resistivity above the deposit. Correct positioning is thus obtained for vertical antenna 20 and for generator 18 of FIGS. 1a to 1d.

The receiving element of the probe is made up of two rectangular iron frames 16 and 17 having elongated form in the vertical direction and located symmetrically with respect to coaxial cable 11. These frames are connected by coaxial cables 19 and 21 to the part of the probe located above plane $F_1$ where the preamplifier for the receiver is located.

Frames 16 and 17 are connected in series. In this way, because of the care with which they are made and maintained in position in the probe symmetrically with respect to the antenna, the magnetic field produced by the current I, which passes through the coaxial cable 11 induces no voltage at the intake of the preamplifier.

On the other hand, the two frames in series are sensitive to the magnetic field H of the reflected wave X provided by an echo coming from the direction OX.

This embodiment of the invention therefore meets the requirement of receiving a reflected wave without being influenced by the simultaneous operation of the emitter.

FIG. 2a shows that the receiving apparatus, in accordance with the invention, is capable of determining the approximate direction from which the echo arrives. This determination utilizes the well known properties of antennas of being insensible to a wave such as the reflected wave Y coming from a direction OY perpendicular to their planes.

To determine the direction of an echo, it is then sufficient, as soon as the echo has been received, to turn the assembly of receiving antennas about the vertical axis of the coaxial cable 11 and note the direction for which the amplitude of the echo is null. To this end, the probe includes appropriate means, not shown in FIG. 2a, for turning the frames with the central part of the probe about the axis of the probe and for measuring the orientation. These means can be of any known type.

The probe of FIG. 2a or the assembly of emitter and receiver of FIG. 2 can be associated with different types of electronic apparatus depending upon the manner of carrying out the process of the invention.

A first manner is based on the direct measurement of the interval of time between the emission of a signal and the return of the corresponding echo by means of an oscilloscope having two vertical inputs (synchroscope).

Figure 3A:
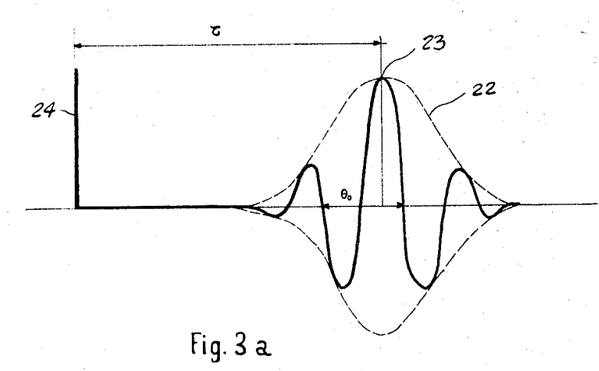
FIG. 3a illustrates a type of signal which can be used to carry out the present invention.

This comprises emitting into the earth an electric current of an intensity I proportionate to a signal obtained by modulating in amplitude a carrying frequency $f_0$ in such a way as to constitute a train of waves of the type shown in FIG. 3a. The envelope 22 of the modulation is a curve analogous to the resonance curve of a selective oscillating circuit or a curve of the well known "Gauss" type. The advantage of this type of modulation is to form a train of waves of which the spectrum is not much spread in the scale of the frequencies about the carrying frequency $f_0$. It is thus possible to assume that the phase of this train of waves passes through the earth with a well defined speed $v(f_0)$. Any other form of signal with a narrow frequency spectrum, such as a signal shown by a Lorentz curve, could also be used in this procedure; $f_0$ would be adjustable between about ten hertz and about 100 kHz., depending upon the distance at which the geological discontinuities are located, the lower frequencies being employed for the most distant discontinuities.

Figure 3B:
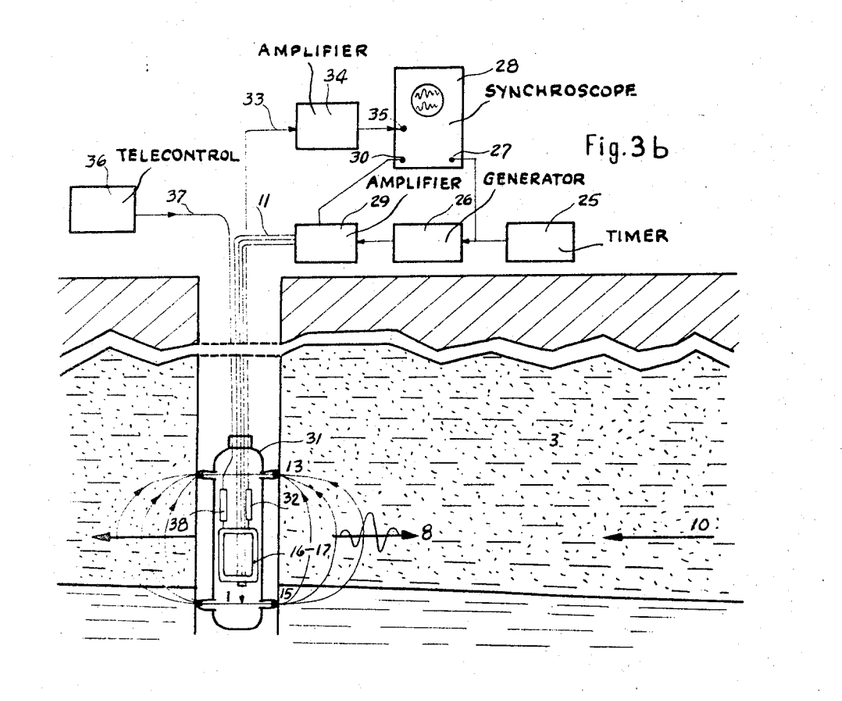
FIG. 3b shows schematically electronic apparatus which can be used in association with the probe of FIG. 2a in an embodiment of the process of the present invention.

FIG. 3b shows schematically electronic apparatus associated with the probe of FIG. 2a. An electronic timer of known type 25 produces at regular intervals synchronization pulses 24 (FIG. 2b) which are supplied to generator 26 and to entry 27 for release of the balance of synchroscope 28. Generator 26 produces an oscillation analogous to that shown in FIG. 2b of which can be easily adjusted the period $\theta_0$ and thus time $\tau_0$ which separates the maximum 23 of the amplitude of this signal from the synchronization impulse 24 (FIG. 3a).

This signal is sent to high power amplifier 29 of known type which produces a current I proportionate to the signal which is sent toward the probe by coaxial cable 11. This amplifier thus produces a voltage proportionate to I which is sent to one of the vertical input terminals 30 of synchroscope 20. Current I is sent into the stratifications of the subsurface by probe 31 through contact fingers 13 and 15, as already shown in FIG. 2a. If lower contact 15 is placed at the level of the rock impregnated with salt water and if the upper contact 13 is placed either in the rock impregnated with oil or, which is preferable, in a layer of weak resistivity above the deposit, current I produces a cylindrical wave with vertical electric polarization which is propagated radially following the interface between the petroleum and the water. When this wave reaches the extremity of the deposit it is there reflected and returns towards the probe which receives it by means of frames 16 and 17. The voltage received in the frames is amplified by a preamplifier 32 and directed toward the surface by coaxial cable 33. It is amplified by amplifier 34 and then applied to the second vertical deflection input terminal 35 of synchroscope 28. The screen of the oscilloscope then shows superposed the direct or emitted signal and the signal produced by the echo.

The measure of the time of passage going and returning of the wave between the bore hole and the extremity of the deposit is then obtained by measurement on the screen of the synchroscope measuring the difference of time between the signals of the two traces. It is necessary to correct this value to take into consideration the time of passage along the cables which connect the probe to the surface apparatus.

The direction of the echo is determined by orienting the frames by means of telecontrol apparatus 36, which, through cable 37, controls servomotor 38. This apparatus can be of any known type.

Figure 3C:
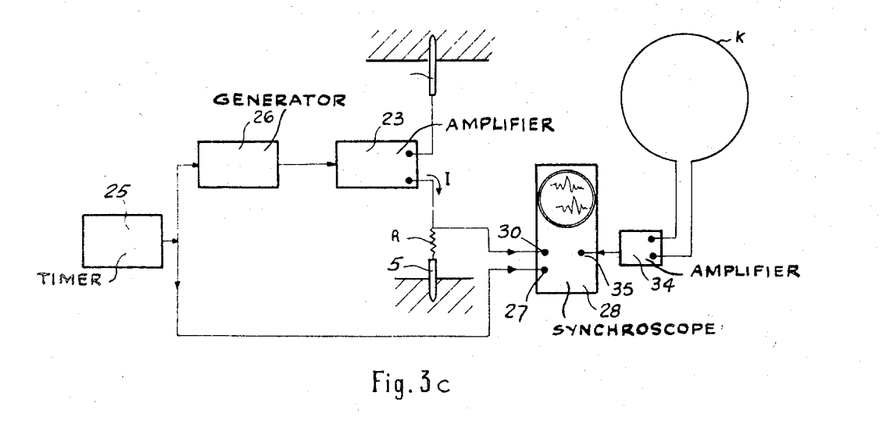
FIG. 3c shows the same electronic apparatus for the same process when the emitting and receiving apparatus correspond to those of FIG. 2.

FIG. 3c illustrates the use of the present invention in a drift using apparatus analogous to that of FIG. 3b, as used in a bore hole, with the difference that the signal is emitted between two pins driven into the earth in the same way as is shown in FIG. 2. A shunt resistance R is utilized to obtain a voltage proportionate to current I which is applied to the first pole 30 of the two curve oscilloscope 28. The scope of the present invention would not be avoided by replacing the shunt by any other apparatus to obtain the same result such as, for example, a transformer with magnetic core connected to the wire leading to pin 5.

The second input terminal of the oscilloscope receives voltage coming from receiver 34 which is connected to receiving frame or loop K. The screen of the oscilloscope thus shows a superposed representation of the direct signal and of the signal produced by the echo.

In a second manner of carrying out the present concept, the interval of time separating the emitted signal from its echo is measured in indirect manner as a frequency beat.

This embodiment uses the variation of the speed of propagation of the waves as a function of the frequency utilizing a wave of constant amplitude having a frequency which is continuously varied with respect to time according to a law $f=f(t)$.

The mathematic form of the function $f(t)$ is determined as a function of the law of variation of the speed of the waves $v=v(f)$ in such a way that there permanently exists a constant frequency difference $\Delta f = F(r)$ between the emitted wave and the wave which is reflected on an obstacle situated at a fixed distance $r$ from the probe.

To determine the function $f(t)$, which the instantaneous frequency of the emitted wave should follow, the variation is considered of $f(t)$ during the time $\tau$ of the going and return of the wave.

Given that:

$$\tau = \frac{2r}{v(f)}$$

$\tau$ is always small and it is possible tot limit it to a development of the first order as follows:

$$\Delta f = f(t+\tau) - f(\tau) = t\frac{df(t)}{dt}$$

to the second order where $$\frac{df(t)}{dt} = f'(t), \ \Delta f = 2r\frac{f'(t)}{v(f)}$$

To have $\Delta f$ constant, it suffices that:

$$\frac{\delta}{\delta t} \cdot \frac{f'(t)}{v(f)} = 0 \tag{I}$$

a differential equation that should verify function $f(t)$.

For example, the variation of the speed of waves with frequency is very often of the form:

$$v = k\sqrt{f} \text{ with } k = 4\sqrt{\frac{\pi \rho}{\mu}} \tag{II}$$

in which formula $\rho$ represents the resistivity of the earth and $\mu$ its magnetic permeability.

It is easy to shown that the variation of the frequency of the form:

$$f = f_0\left(1 + \frac{t}{\theta}\right)^2 \tag{III}$$

where $\theta$ and $f_0$ are constant, satisfies Equation I. Actually, in deriving (III) there is obtained:

$$f'(t) = \frac{2f_0}{\theta}\left(1 + \frac{t}{\theta}\right)$$

The following is then obtained:

$$\frac{f'(t)}{v(f)} = \frac{2\sqrt{f_0}}{k\theta} = \text{Constant} \tag{IV}$$

the differential Equation I is therefore verified.

In a general way, whatever the law of variation of speed of the waves with the frequency, it is sufficient to choose $f(t)$ proportionate to $v(f)$ to obtain a constant frequency beat upon reception of the echo from an obstacle located at a fixed distance.

Joining to the Equation IV the relation $$\Delta f = 2r\frac{f'(t)}{v(f)}$$

as established above, the following is obtained:

$$r = \frac{k\theta}{4\sqrt{f_0}} \cdot \Delta f$$

which gives the distance $r$ between the measuring station and the distance of the geological discontinuity which created the echo, knowing the frequency of beat $\Delta f$.

Figure 4:
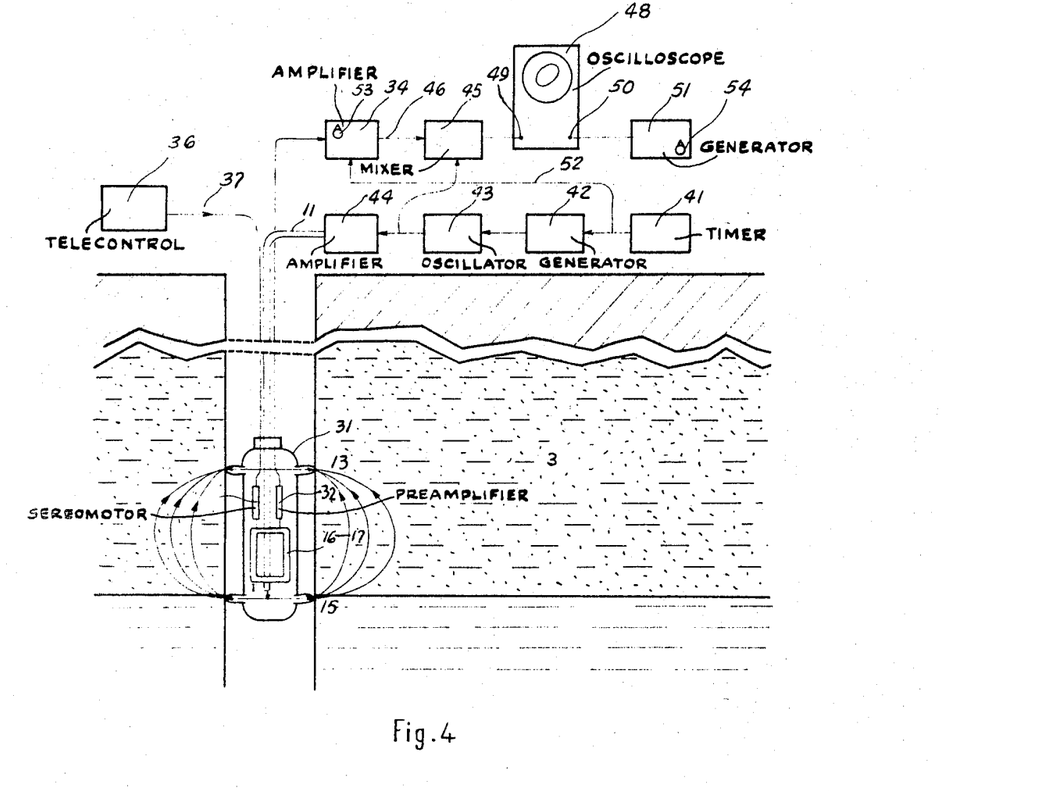
FIG. 4 illustrates apparatus used in another embodiment of the process in accordance with the present invention to determine the interval of time between emission from a probe and reception of the echo.

The manner of carrying out the present invention using this property is best understood by referring to FIG. 4, which shows schematically electronic apparatus to carry out the invention.

Apparatus 41 is a timer periodically producing a sawtooth voltage. This voltage is applied to generator 42 which transforms it to a voltage proportionate to the law of variation in time following the frequency $f(t)$ so as to satisfy Equation I.

In the example which produced the law of variation (III), apparatus 42 can be a simple electronic integrator which transforms the sawtooth voltage from timer 41 into a voltage having a parabolic variation or any other electronic apparatus as presently known producing the same results. The voltage leaving the generator is applied to the electronic frequency control oscillator 43 which delivers to amplifier 44 an oscillation having an instantaneous frequency constantly proportionate to the voltage of the generator.

Amplifier 44 sends the emitter current I through coaxial cable 11 to probe 31 which emits it into the earth through contact fingers 13 and 15. Frames 16–17 of the probe receive the magnetic field of the reflected wave 10 and transform its variations into a sinusoidal voltage which is amplified in preamplifier 32 and is then sent to the earth by coaxial cable 33. This voltage is amplified by amplifier 34 and sent to the first input terminal of a mixer 45 by wire 46. The second input terminal of the mixer receives through wire 47 the voltage from oscillator 43.

The reflected wave 10 has the instantaneous frequency of the emitted wave at the instant of its emission. Because of the modulation of frequency, this instantaneous frequency is different from that of the emitted wave at the instant of reception by probe 10. It follows that the voltages coming to mixer 45 by wires 46 and 47 have different instantaneous frequencies. The beat frequency $\Delta f$ which results is measured by the known method of the Lissajous curves by means of oscilloscope 48 which receives the oscillation frequency $\Delta f$ on its vertical input terminal 49, while the horizontal entry 50 receives an oscillation from frequency generator 51. Any other known means for measuring frequency can be used without departing from the inventive concept.

Amplifier 34 receives through wire 52 the sawtooth voltage from timer 41. This voltage acts in an exponential way on the gain of this amplifier which thus varies in time as the function:

$$e^{\alpha t}$$

The coefficient $\alpha$ is regulated by control button 53.

This arangement of the invention compensates for the exponential weakening increasing with the frequency as:

$$e^{-\alpha \sqrt{f}}$$

which the waves undergo during their going and return in the earth.

Use of this apparatus is had by adjusting control 53 and the frequency control 54 of generator 51 to obtain on the screen of the oscilloscope 48 a stable well defined ellipse. From the frequency of generator 51, the distance separating the axis of the bore from the extremity of the deposit can be obtained.

Apparatus 36, 37 and 38 which control the orientation of the receiving frames of the probe thus determines the direction from which the echoes come and is the same as that shown in FIG. 3b.

Whatever the method employed for determining the interval of time between the emission of the signal and the recpetion of its echo, it is necessary to know the absolute value of the speed of propagation of the electromagnetic wave and its law of variation with the frequency $v = v(f)$.

Theoretically, this law is determined by the resistivity of the propagation medium and it can be obtained from a measure of the resistivity using a known type of diagraphy probe. However, when precise results are desired, it is preferable to measure directly, in situ, the speed of propagation of the waves.

An appropriate method for this determination is described in applicant's copending application referred to above.

The method described hereafter can also be used. This method uses two probes 31a and 31b placed respectively in position in two neighboring locations A and B bored in the same deposit. This method will be better understood by referring to FIG. 5 which shows schematically electronic apparatus for carrying out this procedure.

Figure 5:
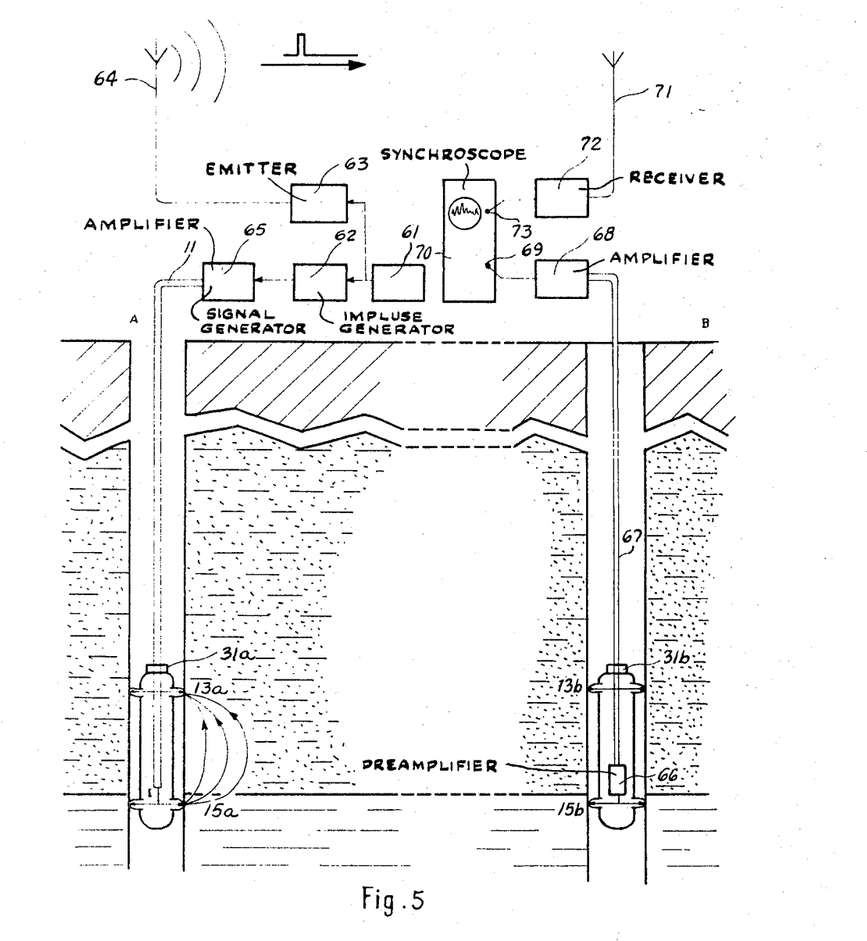
FIG. 5 shows apparatus for determining the speed of propogation in the earth of electromagnetic waves.

At the left of FIG. 5 is shown apparatus installed in emitter bore A. Apparatus 61 is an impulse generator which delivers synchronization pulses to a signal generator 62 and to radioelectric emitter 63, which, through antenna 64, transmits them to the receiving apparatus installed in bore B. Generator 62 is identical to generator 26 of FIG. 3b. It delivers, at a known time after reception of the synchronization pulse, the train of waves shown in FIG. 3a. The period $\theta_0$ of this oscillation is adjustable as desired.

The output voltage of generator 62 is sent to power amplifier 65 which transforms it into a current I proportionate thereto and current I is sent to emitting probe 31a by cable 11. The emitting probe, having an extremely simple construction, comprises only contact fingers 13a electrically connected with the exterior conductor of coaxial cable 11, and contact fingers 15a connected electrically to the center conductor of the coaxial cable. The vertical distance between contacts 13a and 15a is adjustable by suitable means, not shown in the drawings. Contact fingers 13a and 15a lead the current I furnished by amplifier 65 into the earth. This current creates a wave which is propagated in the rock impregnated with oil following the interface between the oil and water.

At bore B, this wave creates a difference of vertical potential which is received by contacts 13b and 15b of the receiving probe 31b. The receiving probe is identical to the emission probe except that it contains a preamplifier 66, which sends to the surface through cable 67 the electric voltage received by the contact fingers 13b and 15b.

At the surface, this voltage is amplified by amplifier 68 and applied to a vertical deflection pole 69 of synchroscope 70. The scanning of this synchroscope is released by the synchronization pulse transmitted by Hertzian waves from bore A and received at bore B by antenna 71 of receiver 72 which sends it to the synchronization input terminal 73 of synchroscope 70.

It is evident that the spirit of the present invention would not be avoided by replacing the Hertzian transmission of the synchronization impulse by any other type of connection such as, for example, connection through coaxial cable or by optical signal which could be transmitted by laser.

The speed of propagation of the electromagnetic waves in air is well known, as is the time of propagation of signals along cables 11 and 67 which connect the probes to the surface apparatus. The time $\Delta t$ separating the synchronization impulse of the peak of the signal that can be measured on the screen of the synchroscope 70 is then the time $\tau$ of initial delay of the signal that is produced by generator 62 increased by the time of propagation $\delta t_1$ along the cables, of the time of propagation T of the waves between the emitting probe and the receiving probe decreased by the time of propagation $\delta t_2$ of the radioelectric waves between the bores A and B. This results as:

$$T = \Delta t - \tau + \delta t_2 - \delta t_1$$

Knowing the distance R between the two bores, the speed of propagation of the waves in the petroleum deposit can be calculated between the two probes.

By measuring this speed for various values of the period $\theta_0$ of the signal, the law of variation:

$$v = v(f) = v\left(\frac{1}{\theta_0}\right)$$

of the speed of propagation of the waves in the petroleum rock can be obtained.

It is not absolutely necessary to bore special shafts for this apparatus. Actually, because of the high electric resistivity of petroleum rock, the possible range of transmission of the signal between the two probes can be several kilometers and it is nearly always possible to find within this range two existing producing wells which can be used for these measurements.

Changes in or modifications to the above-described illustrative embodiments of the present invention may now be suggested to those skilled in the art without departing from the invention. Reference should therefore be had to the appended claims to determine the scope of this concept.

What I claim is:

1. A process for determining the position of the limits of and discontinuities in a geological formation adjacent to geological layers of weaker electric resistivity thereto from a measuring point located in the geological formation comprising the steps of emitting electromagnetic waves in the geological formation from the measuring point, said waves having wave surfaces as cylinders of revolution around an axis of emission, rotating about said axis of emission and in the vicinity thereof at least one frame, maintaining the plane of said frame horizontally spaced from said axis and tangential to the surface of a cylinder of revolution about said axis, said frame exclusively receiving the emitted electromagnetic waves which have been reflected by geological discontinuities by being maintained tangential to the surfaces of said emitted waves during rotation and locating positions of optimum reception for said frame during the rotation of said frame to determine the direction of said geological discontinuity, said positions of optimum reception of said frame defining planes of optimum reception of said waves and the directions of said geological discontinuities, said directions being perpendicular to said axis of emission and parallel to said planes of optimum reception.

2. A process as described in claim 1 including the step of modulating said electromagnetic waves emitted into the geological formation by a signal having a narrow range of frequency, receiving in one of the planes of optimum reception a signal reflected by a discontinuity in the geological formation, measuring the interval of time separating the emission of the signal and the reception of the reflected signal, this interval of time being substantially equal to the time required for said electromagnetic wave to go from the measuring point to the discontinuity and return.

3. A process as described in claim 1, said electromagnetic waves emitted into the geological formation having a frequency $f$ varying with time $t$ in the relationship:

$$f = f_0\left(1 + \frac{t}{\theta}\right)^2$$

where $f_0$ and $\theta$ are constants, determining at the measuring point the beat frequency $\Delta f$ between said emitted electromagnetic waves and the detected electromagnetic waves in one of said planes of optimum reception and locating a discontinunity in the geological formation in a direction parallel to said plane of optimum reception and perpendicular to the axis of emission at a distance $r$ from the measuring point as:

$$r = \frac{k\theta}{4\sqrt{f_0}} \Delta f$$

$\theta$ and $f_0$ having the indicated values and $k$ being a constant satisfying, in the range of frequencies utilized, the relation:

$$v = k\sqrt{f}$$

where $v$ is the speed of propagation in the geological formation of said electromagnetic wave having a frequency $f$.

4. A process as described in claim 2, in which the detected wave is amplified by an amplification factor increasing with time as the function:

$$e^{\alpha t}$$

5. Apparatus for determining by reflection of electromagnetic waves the position of the limits of and discontinuities in a geological formation adjacent to geological layers of weaker electric resistivity than that of the geological formation disposed in a measuring station located in the geological formation comprising means for emitting electromagnetic waves in the geological formation having wave surfaces which are cylinders of revolution about an axis of emission, said emitting means including an antenna having a vertical axis disposed along said axis of emission, means located in the vicinity of said axis of emission for detecting the emitted electromagnetic waves which are reflected by a geological discontinuity in planes tangential to said surfaces of the waves, said detecting means including at least one reciving frame mounted to turn about the vertical axis of said antenna and having its plane horizontally spaced therefrom with an orientation tangential to a cylindrical surface of revolution about the axis of emission and means for turning said frame about the vertical axis of said antenna.

6. Apparatus as described in claim 5, said antenna comprising two pins buried in the earth in alignment, one with the other, and forming said axis of emission.

7. Apparatus as described in claim 5 including means for producing an emission signal having a short spectrum of frequency connected to said antenna by modulation of a low frequency oscillation, a two sweep synchroscope, a generator of synchronization impulses controlling the scanning of said synchroscope, apparatus for introducing said emission signal into the first sweep of said synchroscope and amplification means connected to said receiving frame and to said second sweep of said synchroscope.

8. Apparatus as described in claim 5, including means for producing a low frequency wave having a frequency increasing as the square of the time connected to said antenna, differential apparatus for determining the difference between the frequency of said wave and the frequency of electromagnetic waves received by said receiving frame, said differential apparatus being connected to said means for production of said low frequency wave and connected to said frame through a controllable gain amplifier and means for measuring the difference of frequency.

9. Apparatus as described in claim 8, said measuring means including an oscilloscope including a vertical deviation input terminal and a horizontal deviation input terminal, a generator of adjustable constant frequency oscillations, said generator being connected to one of said terminals of said oscilloscope and said differential apparatus being connected to the other of said terminals of said oscilloscope, and control means for said gain amplifier as an exponential function of time.

10. Apparatus for determining by reflection of electromagnetic waves the position of the limits of and discontinuities in a geological formation adjacent to geological layers of weaker electric resistivity than that of the geological formation disposed in a measuring station located in the geological formation comprising means for emitting electromagnetic waves in the geological formation having wave surfaces which are cylinders of revolution about an axis of emission, said emitting means including an antenna disposed along said axis of emission, means for receiving electromagnetic waves in the neighborhood of said axis of emission in planes tangential to said surfaces of said waves, said receiving means including two receiving frames mounted to turn about the vertical axis of said antenna with an orientation tangential to a surface of revolution about said axis of emission, means for turning said frames together about the vertical axis of said antenna, a coaxial cable for said emission means, an interior electric conductor and an exterior electric conductor for said coaxial cable, a first plurality of contact fingers connected to said exterior conductor and engaging the earth, a second plurality of contact fingers connected to said interior conductor and contacting the earth, said first and second pluralities of contact fingers being spaced apart and at different positions along said coaxial cable, said antenna comprising the portion of said coaxial cable between said two pluralities of fingers, said two receiving frames being parallel to each other, connected in series and disposed symmetrically with respect to said antenna.

References Cited

UNITED STATES PATENTS

| | | | |
|---|---|---|---|
| 2,139,460 | 12/1938 | Potapenko | 324—6 XR |
| 2,653,220 | 9/1953 | Bays | 325—28 |
| 2,657,380 | 10/1953 | Donaldson | 324—6 XR |
| 2,661,466 | 12/1953 | Barret | 324—6 XR |
| 3,168,694 | 2/1965 | Slattery | 324—6 |
| 3,286,163 | 11/1966 | Holser et al. | 324—6 |
| 3,350,634 | 10/1967 | Hoehn | 324—6 |

RUDOLPH V. ROLINEC, *Primary Examiner.*

G. R. STRECKER, *Assistant Examiner.*